US012623372B2

(12) United States Patent
Nilsson et al.

(10) Patent No.: US 12,623,372 B2
(45) Date of Patent: *May 12, 2026

(54) METHOD TO PRODUCE A VENEERED ELEMENT AND A VENEERED ELEMENT

(71) Applicant: Välinge Innovation AB, Viken (SE)

(72) Inventors: Magnus Nilsson, Båstad (SE); Sofia Nilsson, Jonstorp (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,648

(22) Filed: Jun. 26, 2024

(65) Prior Publication Data

US 2024/0408787 A1 Dec. 12, 2024

Related U.S. Application Data

(63) Continuation of application No. 17/543,962, filed on Dec. 7, 2021, now Pat. No. 12,053,905.

(30) Foreign Application Priority Data

Dec. 8, 2020 (SE) .................................... 2051432-9

(51) Int. Cl.
*B27D 5/00* (2006.01)
*B27N 3/04* (2006.01)
*B27N 3/06* (2006.01)

(52) U.S. Cl.
CPC ............... *B27N 3/06* (2013.01); *B27D 5/006* (2013.01); *B27N 3/04* (2013.01)

(58) Field of Classification Search
CPC ................................ B27D 5/003; B27D 5/006
USPC ........................................................... 428/157
See application file for complete search history.

(56) References Cited

U.S. PATENT DOCUMENTS

| | | | |
|---|---|---|---|
| 7,811,489 B2 | 10/2010 | Pervan et al. | |
| 8,302,367 B2 | 11/2012 | Schulte | |
| 8,349,234 B2 | 1/2013 | Ziegler et al. | |
| 8,349,235 B2 | 1/2013 | Pervan et al. | |

(Continued)

FOREIGN PATENT DOCUMENTS

| | | | |
|---|---|---|---|
| DE | 102012006451 A1 * | 10/2013 | ............. B27M 1/02 |
| GB | 2085357 A | 4/1982 | |

(Continued)

OTHER PUBLICATIONS

Machine_English_translation_DE_102012006451_A1; Vietmeyer, T.; Surface Structuring Method; Feb. 10, 2013; EPO; whole document (Year: 2025).*

(Continued)

*Primary Examiner* — Tahseen Khan
(74) *Attorney, Agent, or Firm* — Boone IP Law

(57) ABSTRACT

A method to produce a veneered element, including providing a first layer of a first powder and applying a second layer of a second powder above the first layer. Further the method includes applying a veneer layer above the second layer. Thereafter heating and pressing the first layer, the second layer and the veneer layer together to form the veneered element and forming a bevel at least partly along at least one side portion of the veneered element, where the first layer, the second layer and the veneer layer are at least partly exposed in the bevel.

17 Claims, 9 Drawing Sheets

(56) References Cited

U.S. PATENT DOCUMENTS

| | | | | |
|---|---|---|---|---|
| 8,407,963 | B2 | 4/2013 | Schulte | |
| 8,419,877 | B2 | 4/2013 | Pervan et al. | |
| 8,431,054 | B2 | 4/2013 | Pervan et al. | |
| 8,480,841 | B2 | 7/2013 | Pervan et al. | |
| 8,481,111 | B2 | 7/2013 | Ziegler et al. | |
| 8,499,520 | B2 | 8/2013 | Schulte | |
| 8,617,439 | B2 | 12/2013 | Pervan et al. | |
| 8,635,829 | B2 | 1/2014 | Schulte | |
| 8,650,738 | B2 | 2/2014 | Schulte | |
| 8,663,785 | B2 | 3/2014 | Ziegler et al. | |
| 8,728,564 | B2 | 5/2014 | Ziegler et al. | |
| 8,752,352 | B2 | 6/2014 | Schulte | |
| 8,784,587 | B2 | 7/2014 | Lindgren et al. | |
| 8,920,874 | B2 | 12/2014 | Ziegler et al. | |
| 8,920,876 | B2 | 12/2014 | Vetter et al. | |
| 8,993,049 | B2 | 3/2015 | Pervan | |
| 9,085,905 | B2 | 7/2015 | Persson et al. | |
| 9,109,366 | B2 | 8/2015 | Schulte | |
| 9,181,698 | B2 | 11/2015 | Pervan et al. | |
| 9,255,405 | B2 | 2/2016 | Pervan et al. | |
| 9,296,191 | B2 | 3/2016 | Pervan et al. | |
| 9,352,499 | B2 | 5/2016 | Ziegler et al. | |
| 9,403,286 | B2 | 8/2016 | Vetter et al. | |
| 9,410,319 | B2 | 8/2016 | Ziegler et al. | |
| 9,556,622 | B2 | 1/2017 | Pervan et al. | |
| 9,783,996 | B2 | 10/2017 | Pervan et al. | |
| 10,017,950 | B2 | 7/2018 | Pervan | |
| 10,100,535 | B2 | 10/2018 | Pervan et al. | |
| 10,214,913 | B2 | 2/2019 | Persson et al. | |
| 10,286,633 | B2 | 5/2019 | Lundblad et al. | |
| 10,315,219 | B2 | 6/2019 | Jacobsson | |
| 10,344,379 | B2 | 7/2019 | Pervan et al. | |
| 10,364,578 | B2 | 7/2019 | Pervan | |
| 10,392,812 | B2 | 8/2019 | Pervan | |
| 10,442,152 | B2 | 10/2019 | Schulte | |
| 10,442,164 | B2 | 10/2019 | Schulte | |
| 10,493,729 | B2 | 12/2019 | Pervan et al. | |
| 10,513,094 | B2 | 12/2019 | Persson et al. | |
| 10,800,186 | B2 | 10/2020 | Pervan et al. | |
| 10,828,881 | B2 | 11/2020 | Bergelin et al. | |
| 10,857,765 | B2 | 12/2020 | Schulte | |
| 10,899,166 | B2 | 1/2021 | Pervan et al. | |
| 10,913,176 | B2 | 2/2021 | Lindgren et al. | |
| 10,926,509 | B2 | 2/2021 | Schulte | |
| 10,981,362 | B2 | 4/2021 | Ziegler et al. | |
| 10,988,941 | B2 | 4/2021 | Ziegler et al. | |
| 11,040,371 | B2 | 6/2021 | Jacobsson | |
| 11,046,063 | B2 | 6/2021 | Persson et al. | |
| 11,072,156 | B2 | 7/2021 | Schulte | |
| 11,090,972 | B2 | 8/2021 | Persson et al. | |
| 11,135,814 | B2 | 10/2021 | Pervan et al. | |
| 11,167,533 | B2 | 11/2021 | Ziegler et al. | |
| 11,235,565 | B2 | 2/2022 | Pervan et al. | |
| 11,313,123 | B2 | 4/2022 | Pervan et al. | |
| 11,318,726 | B2 | 5/2022 | Pervan et al. | |
| 2009/0145066 | A1 | 6/2009 | Pervan et al. | |
| 2009/0155612 | A1 | 6/2009 | Pervan et al. | |
| 2010/0092731 | A1 | 4/2010 | Pervan et al. | |
| 2010/0291397 | A1 | 11/2010 | Pervan et al. | |
| 2010/0300030 | A1 | 12/2010 | Pervan et al. | |
| 2010/0323187 | A1 | 12/2010 | Kalwa | |
| 2011/0146188 | A1* | 6/2011 | Wallin | E04F 15/02033 29/897.32 |
| 2011/0175251 | A1 | 7/2011 | Ziegler et al. | |
| 2011/0177319 | A1 | 7/2011 | Ziegler et al. | |
| 2011/0177354 | A1 | 7/2011 | Ziegler et al. | |
| 2011/0189448 | A1 | 8/2011 | Lindgren et al. | |
| 2011/0247748 | A1 | 10/2011 | Pervan et al. | |
| 2011/0250404 | A1 | 10/2011 | Pervan et al. | |
| 2011/0293906 | A1 | 12/2011 | Jacobsson | |
| 2012/0124932 | A1 | 5/2012 | Schulte et al. | |
| 2012/0263878 | A1 | 10/2012 | Ziegler et al. | |
| 2012/0263965 | A1 | 10/2012 | Persson et al. | |
| 2012/0264853 | A1 | 10/2012 | Ziegler et al. | |
| 2012/0308774 | A1 | 12/2012 | Haakansson et al. | |
| 2013/0092314 | A1 | 4/2013 | Ziegler et al. | |
| 2013/0095315 | A1 | 4/2013 | Pervan et al. | |
| 2013/0122255 | A1 | 5/2013 | Chen | |
| 2013/0189534 | A1 | 7/2013 | Pervan et al. | |
| 2013/0269863 | A1 | 10/2013 | Pervan et al. | |
| 2013/0273244 | A1 | 10/2013 | Vetter et al. | |
| 2013/0273245 | A1 | 10/2013 | Ziegler et al. | |
| 2014/0044872 | A1 | 2/2014 | Pervan | |
| 2014/0075874 | A1 | 3/2014 | Pervan et al. | |
| 2014/0171554 | A1 | 6/2014 | Ziegler et al. | |
| 2014/0178630 | A1 | 6/2014 | Pervan et al. | |
| 2014/0186610 | A1 | 7/2014 | Pervan | |
| 2014/0199558 | A1 | 7/2014 | Pervan et al. | |
| 2014/0234531 | A1 | 8/2014 | Ziegler et al. | |
| 2015/0017461 | A1 | 1/2015 | Lindgren et al. | |
| 2015/0079280 | A1 | 3/2015 | Vetter et al. | |
| 2015/0093502 | A1 | 4/2015 | Ziegler et al. | |
| 2015/0111055 | A1 | 4/2015 | Persson et al. | |
| 2015/0159382 | A1 | 6/2015 | Pervan | |
| 2015/0197942 | A1 | 7/2015 | Pervan et al. | |
| 2015/0197943 | A1 | 7/2015 | Ziegler et al. | |
| 2015/0275526 | A1 | 10/2015 | Persson et al. | |
| 2015/0298433 | A1 | 10/2015 | Kalwa | |
| 2016/0031189 | A1 | 2/2016 | Pervan et al. | |
| 2016/0114495 | A1 | 4/2016 | Pervan et al. | |
| 2016/0186318 | A1 | 6/2016 | Pervan et al. | |
| 2016/0230400 | A9 | 8/2016 | Pervan et al. | |
| 2016/0368180 | A1 | 12/2016 | Ziegler et al. | |
| 2016/0369507 | A1 | 12/2016 | Pervan et al. | |
| 2016/0375674 | A1 | 12/2016 | Schulte | |
| 2017/0120564 | A1 | 5/2017 | Schulte | |
| 2017/0165936 | A1 | 6/2017 | Schulte | |
| 2017/0190156 | A1 | 7/2017 | Lundblad et al. | |
| 2017/0305119 | A1 | 10/2017 | Bergelin et al. | |
| 2017/0348984 | A1 | 12/2017 | Pervan et al. | |
| 2018/0002934 | A1 | 1/2018 | Pervan et al. | |
| 2018/0291638 | A1 | 10/2018 | Pervan | |
| 2018/0304491 | A1 | 10/2018 | Hanses | |
| 2018/0370278 | A1 | 12/2018 | Persson et al. | |
| 2019/0010711 | A1 | 1/2019 | Pervan et al. | |
| 2019/0202178 | A1 | 7/2019 | Ziegler | |
| 2019/0210329 | A1* | 7/2019 | Ziegler | B32B 9/045 |
| 2019/0210330 | A1 | 7/2019 | Ziegler et al. | |
| 2019/0277039 | A1 | 9/2019 | Persson et al. | |
| 2019/0284821 | A1 | 9/2019 | Pervan | |
| 2019/0292796 | A1 | 9/2019 | Pervan et al. | |
| 2019/0338534 | A1 | 11/2019 | Pervan | |
| 2020/0055287 | A1* | 2/2020 | Lundblad | B32B 27/20 |
| 2020/0078825 | A1 | 3/2020 | Jacobsson | |
| 2020/0079059 | A1 | 3/2020 | Schulte | |
| 2020/0094512 | A1 | 3/2020 | Schulte | |
| 2020/0164622 | A1 | 5/2020 | Pervan et al. | |
| 2020/0215799 | A1 | 7/2020 | Hedlund et al. | |
| 2020/0223197 | A1 | 7/2020 | Hedlund et al. | |
| 2021/0001647 | A1 | 1/2021 | Pervan et al. | |
| 2021/0008863 | A1 | 1/2021 | Bergelin et al. | |
| 2021/0078305 | A1 | 3/2021 | Schulte | |
| 2021/0101310 | A1 | 4/2021 | Lindgren et al. | |
| 2021/0197534 | A1 | 7/2021 | Ziegler et al. | |
| 2021/0277670 | A1 | 9/2021 | Ziegler et al. | |
| 2021/0323297 | A1 | 10/2021 | Slottemo et al. | |
| 2022/0009248 | A1 | 1/2022 | Ryberg et al. | |
| 2022/0024189 | A1 | 1/2022 | Ziegler et al. | |
| 2022/0024195 | A1 | 1/2022 | Schulte | |
| 2022/0063326 | A1 | 3/2022 | Persson et al. | |

FOREIGN PATENT DOCUMENTS

| | | | |
|---|---|---|---|
| WO | 2014025309 | A1 | 2/2014 |
| WO | 2015/002599 | A1 | 1/2015 |
| WO | 2015/105456 | A1 | 7/2015 |
| WO | 2015/174909 | A1 | 11/2015 |

(56) References Cited

FOREIGN PATENT DOCUMENTS

| | | | |
|---|---|---|---|
| WO | 2019/139522 | A1 | 7/2019 |
| WO | 2020/145870 | A1 | 7/2020 |

OTHER PUBLICATIONS

U.S. Appl. No. 16/365,764, Christer Lundblad, filed Mar. 27, 2019.
U.S. Appl. No. 17/090,511, Guido Schulte, filed Nov. 5, 2020.
U.S. Appl. No. 17/697,417, Göran Ziegler, filed Mar. 17, 2022.
U.S. Appl. No. 17/711,487, Darko Pervan, filed Apr. 1, 2022.
U.S. Appl. No. 17/768,022, Rickard Rittinge, filed Apr. 11, 2022.
U.S. Appl. No. 17/769,594, Rickard Rittinge, filed Apr. 15, 2022.
U.S. Appl. No. 18/047,755, Guido Schulte, filed Oct. 19, 2022.
U.S. Appl. No. 18/289,506, Göran Ziegler, filed Nov. 3, 2023.
U.S. Appl. No. 18/392,427, Göran Ziegler, filed Dec. 21, 2023.
U.S. Appl. No. 18/576,241, Rickard Rittinge, filed Jan. 3, 2024.
U.S. Appl. No. 18/576,294, Rickard Rittinge, filed Jan. 3, 2024.
U.S. Appl. No. 18/741,549, Daniel Scialanga, filed Jun. 12, 2024.
U.S. Appl. No. 18/914,474, Göran Ziegler, filed Oct. 14, 2024.
International Preliminary Report on Patentability received for PCT Patent Application No. PCT/SE2021/051215, mailed on Jun. 22, 2023, 6 pages.
International Search Report and Written Opinion received for PCT Patent Application No. PCT/SE2021/051215, mailed on Jan. 25, 2022, 12 pages.
1 Supplementary European Search Report for Application No. 21903961.7 dated Jan. 16, 2025, 9 pages.

* cited by examiner

METHOD TO PRODUCE A VENEERED ELEMENT AND A VENEERED ELEMENT

CROSS REFERENCE TO RELATED APPLICATIONS

The present application is a continuation of U.S. application Ser. No. 17/543,962, filed on Dec. 7, 2021, which claims the benefit of Swedish Application No. 2051432-9, filed on Dec. 8, 2020. The entire contents of each of U.S. application Ser. No. 17/543,962 and Swedish Application No. 2051432-9 are hereby incorporated herein by reference in their entirety.

TECHNICAL FIELD

The present application relates to a method to produce a veneered element, and a veneered element.

TECHNICAL BACKGROUND

Floor coverings having a wooden surface may be of several different types. For example, solid wood flooring is formed of a solid piece of wood in form of a panel. Engineered wood floorings are formed of a surface layer of wood attached to a core, where the core may be a lamella core or a wood-based panel, such as plywood, MDF or HDF. Yet another example is a wood veneer being glued to a core, previously described. Wood veneer is a thin wood layer, e.g., having a thickness of 0.2-1 mm. Compared to solid wood and engineered wood flooring, wood veneer floorings can be produced to a lower cost since only a thin wood layer is used without losing the feeling of a natural wooden floor covering.

WO2015002599 is a document disclosing a floor covering of yet another example, having a first layer and a second layer, including wood fibres, which can have different properties by having different binders. By having different binders tension resulting from pressing, cooling and/or climate changes can be reduced. Further, in an example, it is disclosed that a first layer may have pigments to create a uniform colour to be able to cover a surface of a carrier having an uneven colour. The first layer may then be a good base layer for printing with its uniform colour. The document however does not address the possibilities of controlling the layers further in order to create a desirable overall design of a building panel, such as a veneered element. The document does also not disclose any example of a floor covering having a veneer layer and therefore also does not disclose, e.g., the effect of appearance of the veneer layer of the overall design of the floor covering.

WO2019139522 discloses a method to produce a veneered element and such a veneered element including a first layer, a second layer and a veneer layer. Described therein the layers below the veneer layer may have different properties, where one layer may be pigmented or dyed and the other layer may be free from pigments and/or dye, or where the layers differs in colour. In this way the design of the veneer layer can be controlled after pressing the layers together where the layers below at least partly permeate into the veneer layer and, if there are defects such as cracks or knots or holes, penetrate into open defects of the veneer layer. However, the document does not disclose the impact of the different types of layers on the overall design of the veneered element.

WO2020145870 disclose another example of a method to produce a veneered element and such a veneered element but with the same drawbacks as for WO2019139522.

SUMMARY

An object of the present disclosure is to provide improvements over known art. This object is achieved by techniques defined herein.

In a first aspect of the present disclosure, there is provided a method to produce a veneered element, comprising:

- providing a first layer of a first powder,
- applying a second layer of a second powder above the first layer,
- applying a veneer layer above the second layer,
- heating and pressing the first layer, the second layer and the veneer layer together to form a veneered element,
- forming a bevel at least partly along at least one side portion of the veneered element, wherein the first layer, the second layer and the veneer layer are at least partly exposed in the bevel. Examples of advantages with the above defined method is that the overall design of the veneered element is taken into consideration and that the overall design of the veneered element can be controlled by carefully choosing and combining different features of the first layer, the second layer and the veneer layer.

In an embodiment the first powder and/or the second powder is applied as a powder having a predetermined content of moisture, such as between 5 and 80 wt %, preferably between 5 and 50 wt %, based on the total weight of the first powder and/or second powder without added moisture. An advantage with controlling the moisture content of the first powder and/or the second power is to facilitate the many different application alternatives, e.g. scattering, rolling or spraying.

The first layer and/or the second layer may include a thermosetting binder. The thermosetting binder will, e.g., create a desirable curing when heat and pressure is applied.

Further, the total amount of applied first powder and second powder may be more than 300 g/m$^2$. This amount is preferred as it will provide the desirable curing for a strong and durable veneered element.

In another embodiment the bevel has a depth of between Y and Z mm. This is a preferred feature of the bevel for the overall design of the veneered element.

Yet further, the bevel may have an angle $\alpha$ in the range of about 15 to about 75 degrees, or in the range of about 20 to about 50 degrees, or in the range of about 30 to about 45 degrees. These ranges are preferred in order to be able to adapt the appearance of the bevel and the overall design of the veneered element.

In an alternative embodiment of the present disclosure the second layer, after the step of heating and pressing, is visible through at least a portion of an open feature of the veneer layer, for example a crack, cavity, hole and/or knot. In an example an open feature of the veneer layer may, during the step of heating and pressing, at least partly be filled with material originated from at least the second layer. This is an advantageous way of controlling the appearance of, e.g., cracks, cavities, holes, and/or knots in the veneer layer.

Further, the first layer and/or the second layer may include colouring such as coloured fibres, pigments and/or dye in order to improve the effect the layers have on the overall design of the veneered element.

In yet another embodiment the method further comprises the step of:

providing a substrate on which the first layer is provided either before the step of heating and pressing or after the step of heating and pressing, wherein the substrate comprises one or more of: a wood-based board, a particleboard, a thermoplastic board, a plywood, a lamella core, a veneer layer, a sheet and/or a non-woven. It is advantageous to be able to incorporate a substrate in the same process in order to increase the efficiency of the method to produce a veneered element.

In another aspect of the present disclosure there is provided a veneer element, comprising:

a first layer, a second layer above the first layer, a veneer layer above the second layer, and a bevel arranged at least partly along at least one side portion of the veneered element, wherein the first layer, the second layer and the veneer layer are at least partly exposed in the bevel. Examples of advantages with the above defined veneered element is that the overall design of it has been considered by carefully choosing and combining different features of the first layer, the second layer and the veneer layer, and by creating a bevel exposing all three layers.

In an embodiment the bevel has a depth of between Y and Z mm. This is a preferred feature of the bevel for the overall design of the veneered element.

The bevel may further have an angle α in the range of about 15 to about 75 degrees, or in the range of about 20 to about 50 degrees, or in the range of about 30 to 45 degrees. These ranges are preferred in order to be able to adapt the appearance of the bevel and the overall design of the veneered element.

In an alternative embodiment the first layer comprises a first powder and the second layer comprises a second powder. This is to even further control the design of the veneered element by giving the first and the second layer different features.

Further, the second layer may be visible through at least a portion of an open feature of the veneer layer, such as a crack, cavity, hole, and/or knot. In an example, any open feature of the veneer layer is at least partly filled with material originated from at least the second layer. This is an advantageous way of controlling the appearance of, e.g., cracks, cavities, holes, and/or knots in the veneer layer.

In an embodiment the veneered element further comprises a substrate on which the first layer is arranged, wherein the substrate comprises one or more of: wood-based board, a particleboard, a thermoplastic board, a plywood, a lamella core, a veneer layer, a sheet and/or a non-woven. It is advantageous to have a substrate which can balance the other layers in the veneered element. It may also provide a solid foundation of the veneered element providing durability and strength.

BRIEF DESCRIPTION OF THE DRAWINGS

Embodiments of the disclosure will be described in the following: reference being made to the appended drawings which illustrate non-limiting embodiments of how the inventive concept can be reduced into practice.

DETAILED DESCRIPTION OF EMBODIMENTS

Figure 1A:
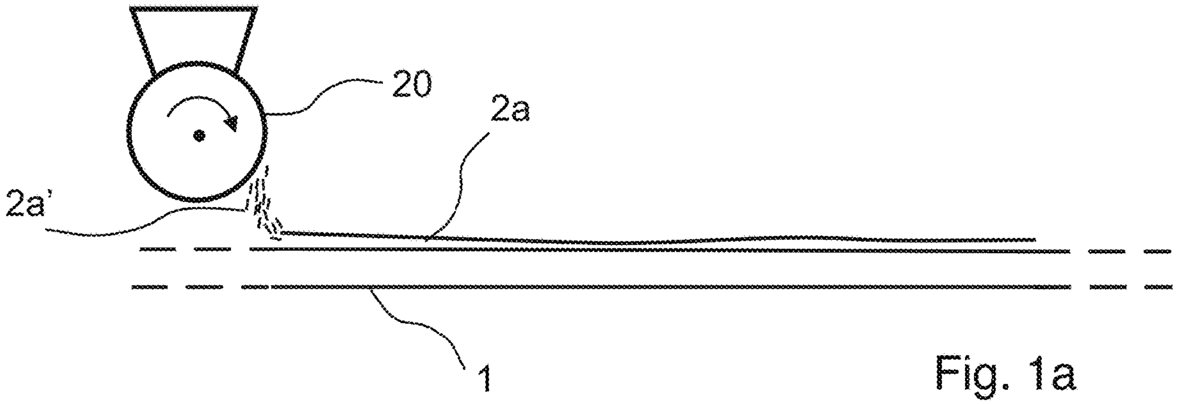
FIGS. 1*a*-1*d* schematically illustrate a method of producing a veneer element according to an embodiment of the present disclosure, FIGS. 2*a*-2*d* schematically illustrate a method of producing a veneer element according to another embodiment of the present disclosure, FIGS. 3*a*-3*b* schematically illustrate a veneered element with a bevel of different depths according to an embodiment of the present disclosure, FIGS. 4*a*-4*d* schematically illustrate a veneered element with a bevel of different angles according to an embodiment of the present disclosure, FIGS. 5*a*-5*b* schematically illustrate a veneered element with different veneer thicknesses according to an embodiment of the present disclosure, and FIG. 6 schematically illustrate a veneered element with defects according to an embodiment of the present disclosure.

In FIGS. 1*a*-1*d* a method for producing a veneered element 10, preferably a wood veneer element, is illustrated. The veneer element 10 may be a furniture component, a building panel such as a floor panel, a ceiling panel, a wall panel, a door panel, a worktop, skirting boards, mouldings, edging profiles, etc. The method includes forming a first layer 2*a* by applying a first powder 2*a*'. The first powder 2*a*' is applied, preferably scattered by a scattering device 20, onto a substrate or carrier 1, such as a sheet of paper, a veneer layer, a non-woven, or a conveyor. Either the scattering device 20 moves along the extension of the carrier 1 or the carrier 1 moves in a direction, passing the scattering device 20 along the way. In an alternative embodiment both the scattering device 20 and the carrier 1 are stationary, and the scattering device 20 is able to scatter the first powder 2*a*' homogenously over a pre-determined part of the carrier 1. In other embodiments, the powder may be sprayed, rolled on, or in another suitable way applied to the carrier 1 in order to form the first layer. The first powder 2*a*' may be a powder having a predetermined content of moisture, which may be preferred in order to facilitate the many different application alternatives. For example, the first powder may include 5-80 wt % moisture, preferably 5-50 wt %, based on the total weight of the first powder without added moisture.

The first powder 2*a*' includes at least a binder, for creating the bindings between some or all of the different layers 2*a*, 2*b*, 3 after curing with heat and pressure. The binder may be a thermosetting binder, a thermoplastic binder or a combination thereof. Some examples of a thermosetting binder are an amino resin, for example melamine formaldehyde, urea formaldehyde, phenolic resin, for example phenol formaldehyde, or one or several combinations thereof, or one or several co-polymers.

In one example the binder may be melamine formaldehyde resin used alone or in combination with urea formaldehyde resin to reduce shrinkage. For example, the binder may be 70-99 wt %, preferably 80-99 wt %, melamine formaldehyde resin and 1-30 wt %, preferably 1-20 wt %, urea formaldehyde resin.

In one example, the binder may be urea formaldehyde resin used alone or in combination with melamine formaldehyde resin to reduce swelling formed by the first layer 2*a* during curing, compared to when melamine formaldehyde resin is used alone. For example, the binder may be 70-99 wt %, preferably 80-99 wt %, urea formaldehyde resin and 1-30 wt %, preferably 1-20 wt %, melamine formaldehyde resin.

Some examples of a thermoplastic binder are polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

In an embodiment, the binder may make up 20-95 wt %, preferably 30-60 wt %, more preferably 40-50 wt % of the total weight of the first powder.

The first powder 2*a*' may further include a filler, an inorganic filler, or an organic filler. Examples of an inorganic filler are mineral-based materials, ceramic-based materials, glass-based materials or plastic-based materials. Examples of an organic filler are wood fibres or pure cellulose. The filler may contain either particles, fibres or a combination thereof. The filler may advantageously come from recycled floor panels or other recycled building panels. The filler may also come from processing of building panels, such as from edge profiling. In an embodiment, the filler may make up 20-70 wt %, preferably 30-60 wt %, more preferably 40-50 wt % of the total weight of the first powder.

The first powder 2*a*' may further include a colourant, for example coloured fibres, pigments, dyes or any other suitable colourants. In an embodiment, the colourant may make up 1-30 wt %, preferably 1-20 wt %, more preferably 2-10 wt % of the total weight of the first powder.

Figure 1B:
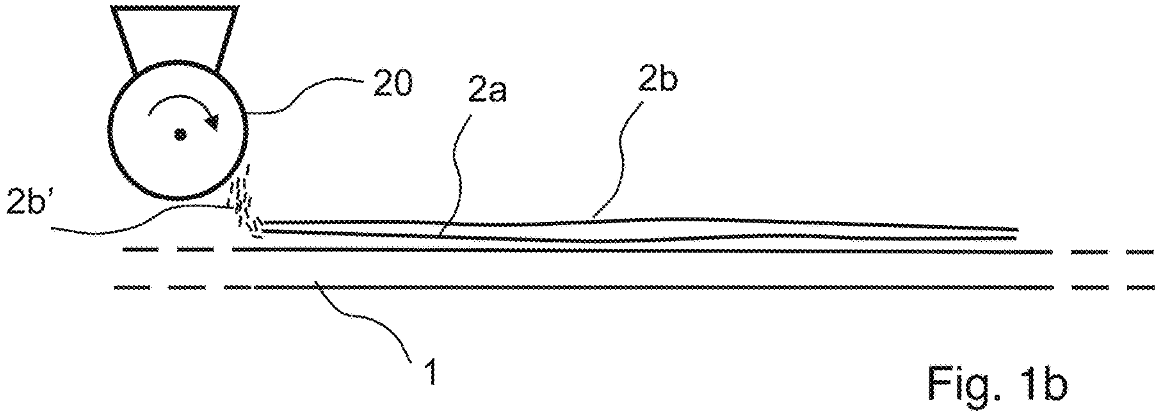

Further, the method includes forming a second layer 2*b* by applying a second powder 2*b*' above and/or on the first layer 2*a*, see FIG. 1*b*. The second powder 2*b*' is applied, preferably scattered by a scattering device 20. The scattering device 20 scattering the second powder 2*b*' may be a different scattering device or the same scattering device as the one scattering the first powder 2*a*'. As described above, in an embodiment, the scattering device 20 either moves along the extension of the carrier 1 or the carrier 1 moves in a direction, passing the scattering device 20 along the way. In an alternative embodiment, both the scattering device 20 and the carrier 1 are stationary, and the scattering device 20 is able to scatter the second powder 2*b*' homogenously over a pre-determined part of the first layer 2*a*. In other embodiments, the powder may be sprayed, rolled on, or in another suitable way applied on or above the first layer 2*a* in order to form the second layer 2*b*. The second powder 2*b*' may be a powder having a predetermined content of moisture, which may be preferred in order to facilitate the many different application alternatives. For example, the second powder may include 5-80 wt % moisture, preferably 5-50 wt %, based on the total weight of the second powder without added moisture.

The second powder 2*b*', preferably, includes at least a colourant. The colourant may, for example, be coloured fibres, pigments, dyes or any other suitable colourants. In an embodiment, the colourant may make up 1-30 wt %, preferably 1-20 wt %, more preferably 2-10 wt % of the total weight of the second powder.

The second powder 2*b*' may further include a binder, for creating bindings between some or all of the different layers 2*a*, 2*b*, 3 after curing with heat and pressure. The binder may be a thermosetting binder, a thermoplastic binder, or a combination thereof. Some examples of a thermosetting binder are an amino resin, for example melamine formaldehyde, urea formaldehyde, phenolic resin, for example phenol formaldehyde, or one or several combinations thereof, or one or several co-polymers.

In one example, the binder may be melamine formaldehyde resin used alone or in combination with urea formaldehyde resin to reduce shrinkage. For example, the binder may be 70-99 wt %, preferably 80-99 wt %, melamine formaldehyde resin and 1-30 wt %, preferably 1-20 wt %, urea formaldehyde resin.

In one example the binder may be urea formaldehyde resin used alone or in combination with melamine formaldehyde resin to reduce swelling formed by the first layer 2*a* during curing, compared to when melamine formaldehyde resin is used alone. For example, the binder may be 70-99 wt %, preferably 80-99 wt %, urea formaldehyde resin and 1-30 wt %, preferably 1-20 wt %, melamine formaldehyde resin.

Some examples of a thermoplastic binder are polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

In an embodiment, the binder may make up 20-95 wt %, preferably 30-60 wt %, more preferably 45-55 wt % of the total weight of the second powder.

The second powder 2*b*' may further include a filler, an inorganic filler or an organic filler. Examples of an inorganic filler are mineral-based materials, ceramic-based materials, glass-based materials, or plastic-based materials. Examples of an organic filler are wood fibres or pure cellulose. The filler may contain either particles, fibres, or a combination thereof. The filler may advantageously come from recycled floor panels or other recycled building panels. In an embodiment, the filler may make up 10-50 wt % or preferably 20-40 wt %.

In order to achieve a strong and durable veneered element 10 it is preferred to apply a total amount of powder of at least 300 g/m$^2$, i.e., the total amount of the first powder 2*a*' and the second powder 2*b*'. For example, a total amount of powder is between 300 g/m$^2$ and 2000 g/m$^2$. More preferably, a total amount of powder is between 320 g/m$^2$ and 400 g/m$^2$. Even more preferably, a total amount of power is between 350 g/m$^2$ and 380 g/m$^2$. To form the second layer 2*b* an amount of at least 100 g/m$^2$ is applied. With a right amount of powder applied a desirable adhesion to a, below described, veneer layer 3 is achieved, after applying heat and pressure, as described below.

Figure 1C:
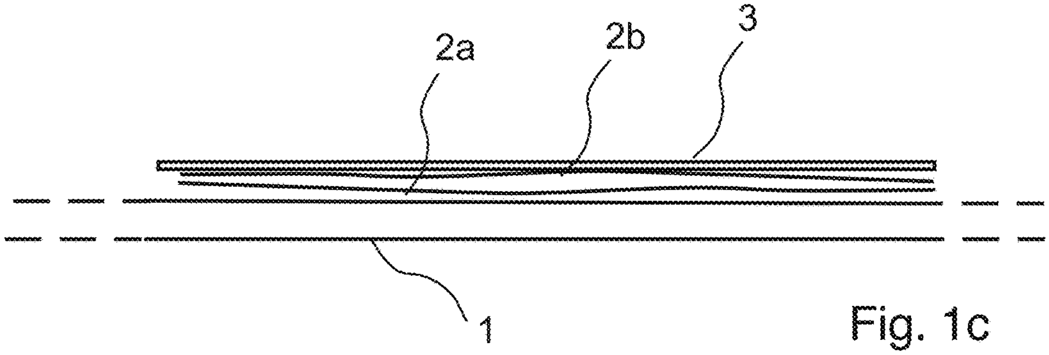

Yet further, the method includes applying a veneer layer 3 above and/or on the second layer 2*b*, see FIG. 1*c*. The veneer layer 3 may preferably be a wood veneer layer or a cork veneer layer. The veneer layer 3 may be applied by any suitable means or in any suitable way. The veneer layer 3 preferably has a thickness of between 0.2 and 2.5 mm. more preferably between 0.2 and 1 mm., even more preferably between 0.3 and 0.6 mm. Yet further, the veneer layer may comprise spliced, stitched or glued veneers, like a veneer sheet, or be separate free veneer strips.

After the veneer layer 3 has been arranged on the second layer 2*b*, heat and a pressure is applied to cure and form the veneered element 10. A preferred temperature during curing is between 140 and 180° C., and more preferably between 150 and 170° C., and even more preferably between 155 and 165° C. A preferred pressure to be applied depends on the pressure technique used for the specific application. If an isochore pressing technique is used then a preferred pressure is between 30 and 80 bars, more preferably between 40 and 70 bars, and even more preferably between 50 and 65 bars. The pressure, of the isochore pressing technique, should be applied between 15 and 50 sec, more preferably between 20 and 40 sec, and even more preferably between 22 and 30 sec. If an isobar pressing technique is used then a preferred pressure is between 15 and 50 bars, preferably between 20 and 40 bars, and even more preferably between 25 and 35 bars. The pressure, of the isobar pressing technique, should be applied between 15 and 50 sec, more preferably between 20 and 40 sec, and even more preferably between 25 and 35 sec.

During the heating and pressing the first 2*a* and second 2*b* layer will at least partly merge into one another. Some or all of the second layer, and possibly some of the first layer, will also at least partly merge into and/or penetrate the veneer layer 3.

Portions of the veneer layer 3, for example a wood veneer, may have defects (not shown) which are not solid and/or dense. Dense portions of a wood veneer are the portions of the veneer layer, where there are no visible by eye defects, i.e., macroscopic defects, such as wood pores. During pressing, material from at least the second layer 2*b* permeates at least partly into the veneer layer 3 and/or through the veneer layer 3. Permeating means that the second layer 2*b* diffuses or penetrates into the microscopic structure of the veneer layer 3, the structure not visible by the eye, such as wood pores.

Figure 1D:
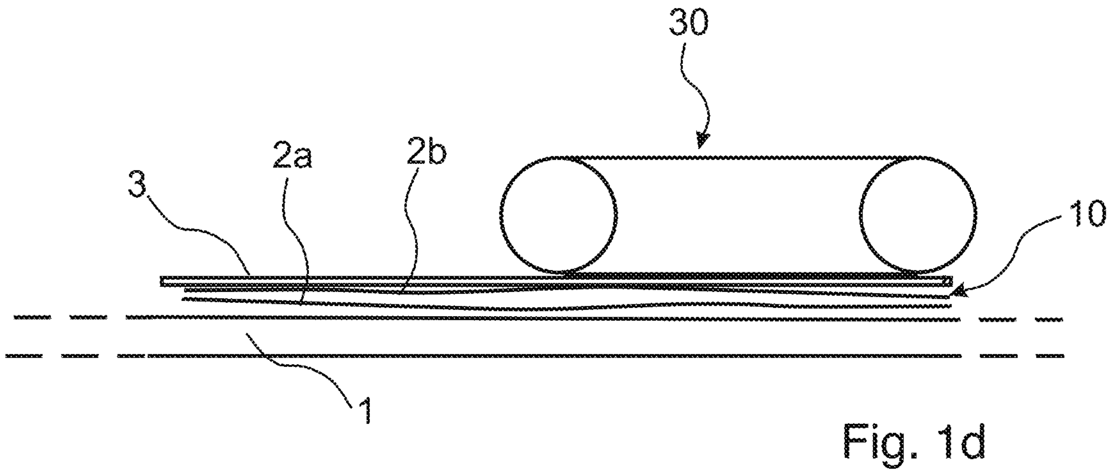

The heat and pressure are preferably applied by a pressure device 30, see FIG. 1*d*. The heating and pressing, to form the veneered element 10, can either be made by having the pressure device 30 moving along the veneered element 10 adding heat and pressure as it moves, or be made by having the carrier move in a direction, passing the pressing device 30 along the way. In another embodiment both the pressing device 30 and the carrier 1 are stationary, thus, the pressure device 30 is able to homogenously heat and press the veneered element 10. After the veneered element 10 has been formed it may be removed from the carrier 1.

Optionally, the veneered element may be attached to a substrate (not shown), either before or after applying heat and pressure to form the veneered element. The surface of the first layer facing away from the second layer and the veneer layer is applied to a surface of the substrate. Thus, the veneer layer faces away from the substrate. The substrate may comprise one or more of: a wood-based board, a particleboard, a thermoplastic board, a plywood, a lamella core, a veneer layer, a sheet, and/or a non-woven. The veneered element may be attached to the substrate in any suitable way, e.g., gluing, pressing or the like.

After the veneered element 10 has been formed, or after the veneered element has been attached to a substrate (optionally), a bevel 12 is formed. Alternatively, after the veneered element has been formed it may be sewn or cut into desirable sizes, and after the veneered element has been formed into desirable sizes, the bevel is formed. The bevel may be created by any suitable process, such as cutting, sawing, or milling. The bevel 12 may run along an extension of a side 13 of the veneered element 10. In an alternative embodiment the bevel may run at least partly along an extension of a side of the veneered element. The bevel may, in further embodiments, also extend partly or entirely along an extension of one or more sides of the veneered element, i.e., along only one side of the veneered element, along the short sides of the veneered element, along the long sides of the veneered element, or around the entire veneered element.

The bevel 12 is formed such that the first layer 2*a*, the second layer 2*b* and the veneer layer 3 are at least partly exposed or visible therein, or that the bevel 12 extends into the first layer 2*a*, the second layer 2*b* and the veneer layer 3. Thus, features, e.g., the colour, of each layer 2*a*, 2*b*, 3 will affect the appearance of the bevel 12 and accordingly also affect the design of the veneered element 10. If the reasoning is reversed, in order to be able to control the appearance of the bevel 12 and accordingly the design of the veneered element 10, the bevel 12 is formed such that the first layer 2*a*, the second layer 2*b* and the veneer layer 3 are at least partly exposed in the bevel 12.

Further, in order to affect and control the appearance of the bevel, a number of different features may be modified, as described herein. Depending on the desired result of the appearance of the bevel a number of features may be modified to achieve the result. It may for example be desirable to have a bevel with a lighter or a darker appearance to blend in with, e.g., the features of the veneer layer. Different ways of affecting, modifying and controlling the appearance of the bevel are explained below.

In FIGS. 2*a*-2*d* a method, of an alternative embodiment, for producing a veneered element 10, preferably a wood veneered element, is illustrated. The veneer element 10 may be a furniture component, a building panel, such as a floor panel, a ceiling panel, a wall panel, a door panel, a worktop, skirting boards, mouldings, edging profiles, etc. The method includes forming a first layer 2*a* by applying a first powder 2*a*'. The first powder 2*a*' is applied, preferably scattered by a scattering device 20, onto a substrate or core 5, which can be a wood-based board, a particleboard, a thermoplastic board, a plywood, a lamella core, a veneer layer, a sheet, and/or a non-woven. Either the scattering device 20 moves along the extension of the core 5 or the core 5 moves in a direction, passing the scattering device 20 along the way. In an alternative embodiment, both the scattering device 20 and the core 5 are stationary, and the scattering device 20 is able to scatter the first powder 2*a*' homogenously over the core 5. In other embodiments, the powder may be sprayed, rolled on, or in another suitable way applied to form the first layer. The first powder 2*a*' may be a powder having a predetermined content of moisture, which may be preferred in order to facilitate the many different application alternatives. For example, the first powder may include 5-80 wt % moisture, preferably 5-50 wt %, based on the total weight of the first powder without added moisture.

The first powder 2*a*' includes at least a binder, for creating the bindings between some or all of the different layers 2*a*, 2*b*, 3 after curing with heat and pressure. The binder may be a thermosetting binder, a thermoplastic binder or a combination thereof. Some examples of a thermosetting binder are an amino resin, for example melamine formaldehyde, urea formaldehyde, phenolic resin, for example phenol formaldehyde, or one or several combinations thereof, or one or several co-polymers. In one example the binder may be melamine formaldehyde resin used alone or in combination with urea formaldehyde resin to reduce shrinkage. In one example, the binder may be urea formaldehyde resin used alone or in combination with melamine formaldehyde resin to reduce tension formed by the first layer 2*a* during curing, compared to when melamine formaldehyde resin is used alone. Some examples of a thermoplastic binder are polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

The first powder 2*a*' may further include a filler, an inorganic filler, or an organic filler. Examples of an inorganic filler are mineral-based materials, ceramic-based materials, glass-based materials, or plastic-based materials. Examples of an organic filler are wood fibres or pure cellulose. The filler may contain either particles, fibres, or a combination thereof. The filler may advantageously come from recycled floor panels or other recycled building panels.

The first powder 2*a*' may further include a colourant, for example coloured fibres, pigments, dyes or any other suitable colourants.

Figure 2A:
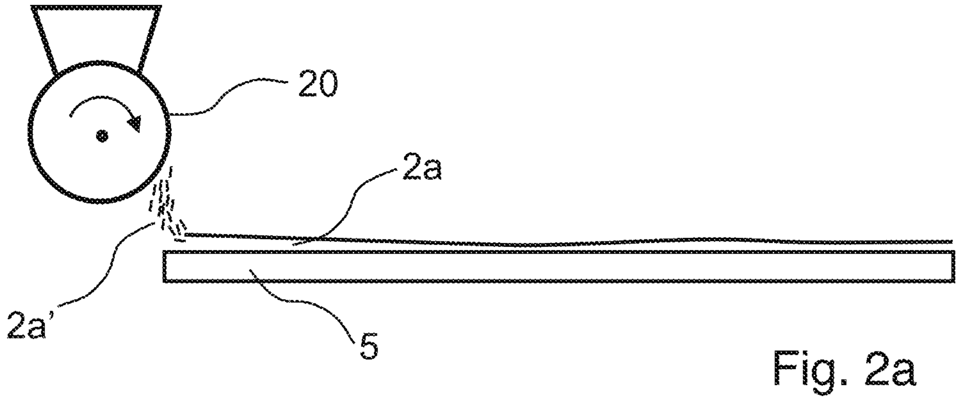
Figure 2B:
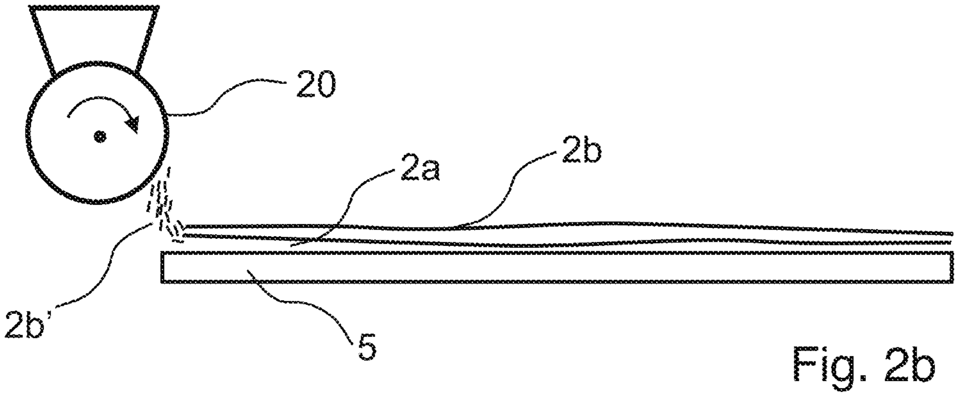

Further, the method includes forming a second layer 2*b* by applying a second powder 2*b*' above and/or on the first layer 2*a* and/or the first powder 2*a*', see FIG. 2*b*. The second powder 2*b*' is applied, preferably scattered by a scattering device 20. The scattering device 20 scattering the second powder 2*b*' may be a different scattering device or the same scattering device as the one scattering the first powder 2*a*'. As described above, in an embodiment, the scattering device 20 either moves along the extension of the core 5 or the core 5 moves in a direction, passing the scattering device 20 along the way. In an alternative embodiment both the scattering device 20 and the core 5 are stationary, and the scattering device 20 is able to scatter the second powder 2*b*' homogenously over the first powder 2*a*'. In other embodiments, the powder may be sprayed, rolled on, or in another suitable way applied to form the second layer 2*b*. The second powder 2*a*' may be a powder having a predetermined content of moisture, which may be preferred in order to facilitate the many different application alternatives. For example, the second powder may include 5-80 wt % moisture, preferably 5-50 wt %, based on the total weight of the second powder without added moisture.

The second powder 2*b*' includes at least a colourant. The colourant may for example be coloured fibres, pigments, dyes or any other suitable colourants.

The second powder 2*b*' may further include a binder, for creating bindings between some or all of the different layers 2*a*, 2*b*, 3 after curing with heat and pressure. The binder may be a thermosetting binder, a thermoplastic binder, or a combination thereof. Some examples of a thermosetting binder are an amino resin, for example melamine formaldehyde, urea formaldehyde, phenolic resin, for example phenol formaldehyde, or one or several combinations thereof, or one or several co-polymers. In one example, the binder may be melamine formaldehyde resin used alone or in combination with urea formaldehyde resin to reduce shrinkage. In one example, the binder may be urea formaldehyde resin used alone or in combination with melamine formaldehyde resin to reduce tension formed by the first layer 2*a* during curing, compared to when melamine formaldehyde resin is used alone. Some examples of a thermoplastic binder are polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

The second powder 2*b*' may further include a filler, an inorganic filler or an organic filler. Examples of an inorganic filler are mineral-based materials, ceramic-based materials, glass-based materials, or plastic-based materials. Examples of an organic filler are wood fibres, or pure cellulose. The filler may contain either particles, fibres, or a combination thereof. The filler may advantageously come from recycled floor panels or other recycled building panels.

The weight percentages for the first powder 2*a*' and second powder 2*b*' of the embodiments of FIGS. 2*a*-2*d* may be the same as those described above for the embodiments of FIGS. 1*a*-1*d*.

In order to achieve a strong and durable veneered element 10 it is preferred to apply a total amount of powder of at least 300 g/m$^2$, i.e., the total amount of the first powder 2*a*' and the second powder 2*b*'. For example, a total amount of powder is between 300 g/m$^2$ and 2000 g/m$^2$. More preferably, a total amount of powder is between 320 g/m$^2$ and 400 g/m$^2$. Even more preferably, a total amount of power is between 350 g/m$^2$ and 380 g/m$^2$. To form the second layer 2*b* an amount of at least 100 g/m$^2$ is applied.

Figure 2C:
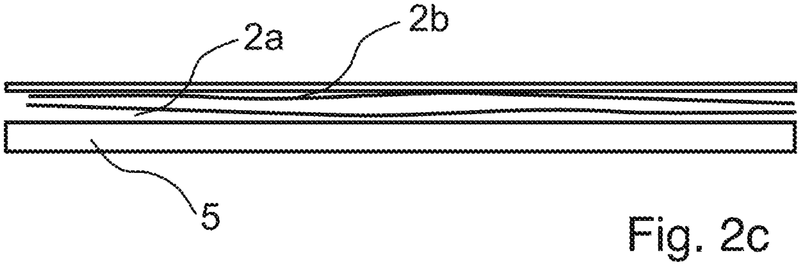

Yet further, the method includes applying a veneer layer 3 above and/or on the second layer 2*b*, see FIG. 2*c*. The veneer layer 3 may preferably be a wood veneer layer or a cork veneer layer. The veneer layer 3 may be applied by any suitable means or in any suitable way. The veneer layer 3 preferably has a thickness of between 0.3 and 0.6 mm. Yet further, the veneer layer may comprise spliced, stitched or glued veneers, like a veneer sheet, or be separate free veneer strips.

After the veneer layer 3 has been arranged on or above the second layer 2*b*, heat and a pressure is applied to form the veneered element 10. A preferred temperature during heating is between 140 and 180° C., and more preferably between 160 and 170° C. A preferred pressure to be applied is between 30 and 80 bars, more preferably between 40 and 60 bars. A preferred time during which the heating and pressing is applied is between 25 and 50 sec, and more preferably between 30 and 40 sec. During heating and pressing the first 2*a* and second 2*b* layer will at least partly merge into one another. Some or all of the second layer, and possibly some of the first layer, will also at least partly merge into and/or penetrate the veneer layer 3.

Portions of the veneer layer 3, for example a wood veneer, may have defects (not shown) which are not solid and/or dense. Dense portions of the wood veneer are the portions of the veneer layer, where there are no visible by eye defects, i.e., macroscopic defects, such as wood pores. During pressing, material from at least the second layer 2*b* permeates at least partly into the veneer layer 3 and/or through the veneer layer 3. Permeating means that the second layer 2*b* diffuses or penetrates into the microscopic structure of the veneer layer 3, the structure not visible by the eye, such as wood pores.

Figure 2D:
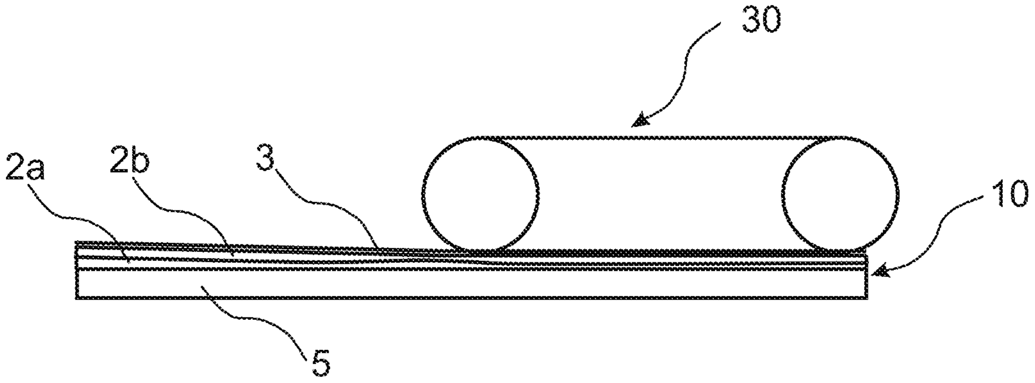

The heat and pressure are preferably applied by a pressure device 30, see FIG. 2*d*. The heating and pressing, to form the veneered element 10, can either be made by having the pressure device 30 moving along the veneered element 10 adding heat and pressure as it moves, or be made by having the core 5 move in a direction, passing the pressing device 30 along the way. In another embodiment both the pressing device 30 and the core 5 are stationary, thus, the pressure device 30 is able to homogenously heat and press the veneered element 10.

After the veneered element 10 has been formed a bevel 12 is created. Alternatively, after the veneered element has been formed it may be sewn or cut into desirable sizes, and after the veneered element has been formed into desirable sizes, the bevel is formed. The bevel may be created by any suitable process, such as cutting, sawing, or milling. The bevel 12 may run along an extension of a side 13 of the veneered element 10. In an alternative embodiment the bevel may run at least partly along an extension of a side of the veneered element. The bevel may, in further embodiments, also extend partly or entirely along an extension of one or more sides of the veneered element, i.e., along only one side of the veneered element, along the short sides of the veneered element, along the long sides of the veneered element, or around the entire veneered element.

The bevel 12 is formed such that the first layer 2*a*, the second layer 2*b* and the veneer layer 3 are at least partly exposed or visible therein, or that the bevel 12 extends into the first layer 2*a*, the second layer 2*b* and the veneer layer 3. Thus, features, e.g., the colour, of each layer 2*a*, 2*b*, 3 will affect the appearance of the bevel 12 and accordingly also affect the design of the veneered element 10. If the reasoning is reversed, in order to be able to control the appearance of the bevel 12 and accordingly the design of the veneered element 10, the bevel 12 is formed such that the first layer 2*a*, the second layer 2*b* and the veneer layer 3 are at least partly exposed therein.

Further, in order to affect and control the appearance of the bevel, a number of different features may be modified, as described herein. Depending on the desired result of the appearance of the bevel a number of features may be modified to achieve the result. It may for example be desirable to have a bevel with a lighter or a darker appearance to blend in with, e.g., the features of the veneer layer. Different ways of affecting, modifying and controlling the appearance of the bevel are explained below.

Figure 6:
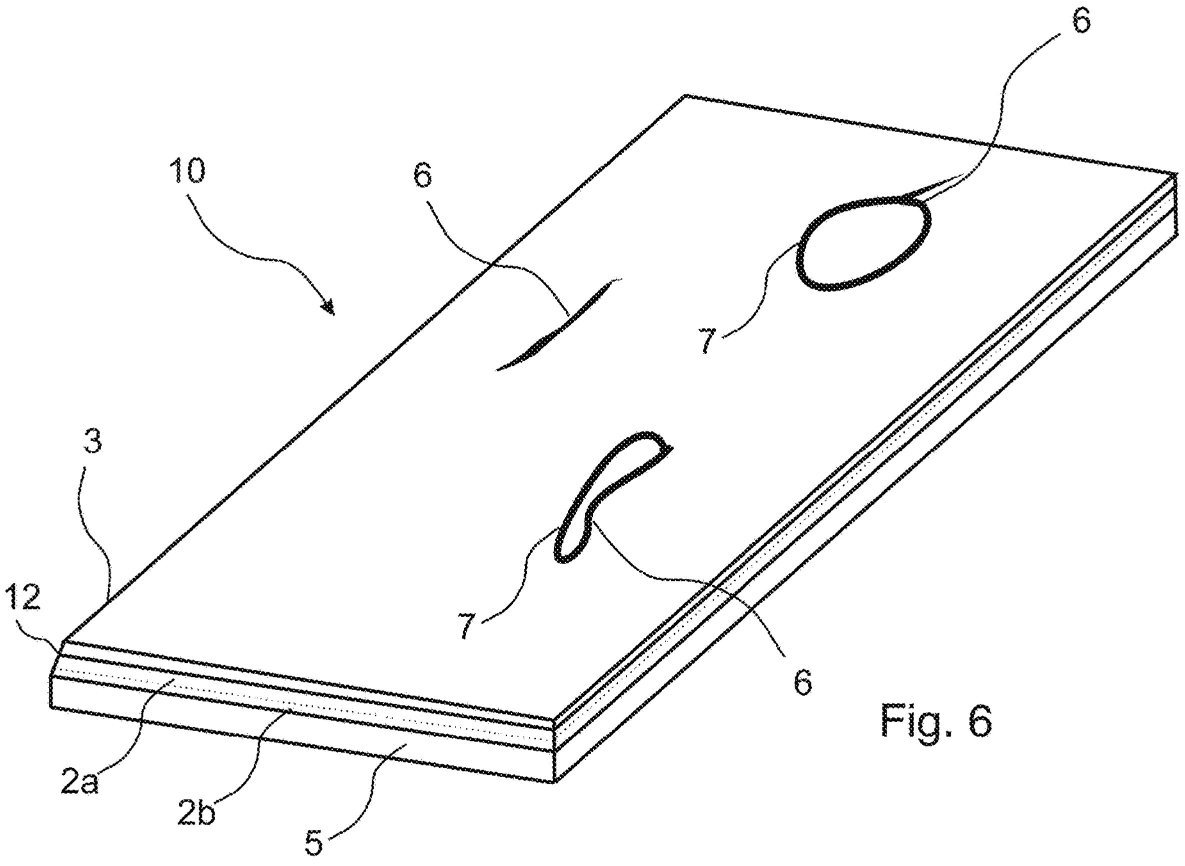

In FIG. 6, which is one example of the desire of being able to control the effects of the different layers 2*a*, 2*b*, 3, a veneered element 10 with an open feature 6, e.g., cracks, holes, and knots is illustrated. An open feature includes any crack, cavity, hole and/or knot in the veneer layer. Further, portions of the veneer layer may have defects which are not solid and/or dense. Dense portions of the wood veneer are the portions of the veneer layer, where there are no visible by eye defects, i.e., macroscopic defects, such as wood pores. During pressing, material from at least the second layer 2*b* permeates at least partly into the veneer layer 3 and/or through the veneer layer 3. Permeating means that the second layer 2*b* diffuses or penetrates into the microscopic structure of the veneer layer 3, the structure not visible by the eye, such as wood pores.

If a veneer layer 3 with open features 6, such as cracks, cavities, holes and/or knots, is applied on or above the second layer 2*b* the features of the second powder 2*b*' will be visible through the open feature 6 after heating and pressing. However, in open features 6 the first layer 2*a* may be visible if the second layer 2*b* is transparent or at least translucent. Translucent means that the second layer 2*b* is more semi-transparent, allowing light to pass through but not detailed shapes. For example, a transparent layer may allow more than 90% of visible light, i.e. light between 380 and 780 nm, to pass through. For example, a translucent layer may allow 20-90% of visible light to pass through.

Pressing will result in that at least the second powder 2*b*', at least partly, will be pressed up into the open feature 6, affecting the appearance of the open feature 6. If the second layer 2*b* is transparent, the first layer 2*a* will affect the appearance of the open feature 6. Therefore, it is desirable and of importance to be able to modify and control the features of both the first layer 2*a* and the second layer 2*b* to create a natural and appealing design. Often, the colour of an edge 7 of the open feature 6 differ from the colour of the rest of the veneer layer 3, which means that the choices and combinations of the first and second layer 2*a*, 2*b* will affect the all over design of the veneered element 10. For example, the edge 7 of such open features 6 of a veneer layer 3 made of birch, is often darker than the rest of the veneer layer 3 which means that a second powder 2*b*' or first powder 2*a*' of a darker colour would be preferred to use in order to correspond with the darker colour of the edge 7. However, if, e.g., the second powder 2*b*' is of a darker colour than the rest of the veneer layer 3, in order to create a desirable appearance of the open features 6, it could result in an undesirable effect in the bevel 12, along the sides of the veneered element 10, where the lighter wood of the veneer layer 3 meets the darker second powder 2*b*' of the second layer 2*b*. Undesirable effects like the one described can however be controlled by the different ways presented below.

Preferably, the material filling the open feature 6, such as a crack, hole and/or knot, is flush with an upper surface of the veneer layer 3 after pressing.

Below, a number of different ways of adapting features of the building panel to affect the design of the panel is described. All features may be combined with each other to achieve the desirable design of the building panel. All features and their specifics can be applied to any of the embodiments presented above or below.

Figure 3A:
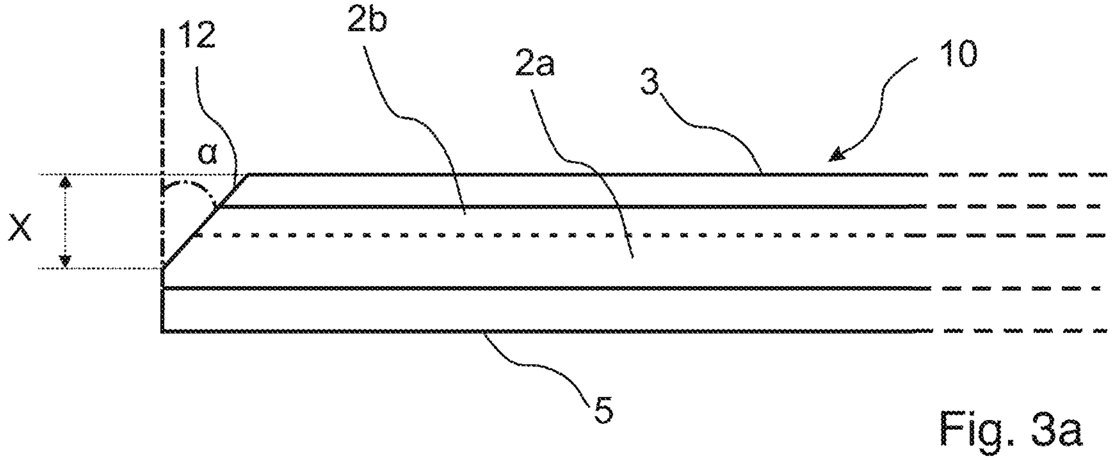
Figure 3B:
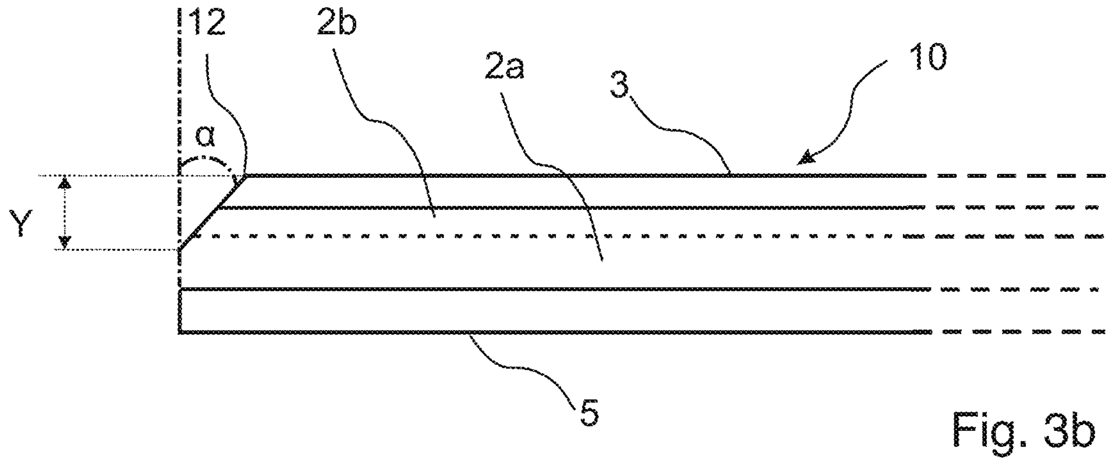

Different Ways of Adapting Features of the Building Panel to Affect the Design of Such Panel Bevel Geometry—Depth, Angle and Shape Depth:

FIGS. 3*a* and 3*b* illustrate two possible ways where the depth of the bevel differs, and this is one way of controlling what is exposed in the bevel. The depth of the bevel is measured from the top surface of the veneer layer vertically down, towards the first and second layer, as illustrated in the figures. If the second layer affects the appearance of the bevel in an undesired way and that effect could be compensated by features of the first layer then it would be desirable to have a deeper bevel, exposing more of the first layer in the bevel. Vice versa, if the first layer affects the appearance of the bevel in an undesired way it would be desirable to have shallower bevel, exposing less of the first layer in the bevel. A preferred depth of a bevel is between 0.1 and 0.7 mm, and even more preferred between 0.2 and 0.5 mm.

Figure 4A:
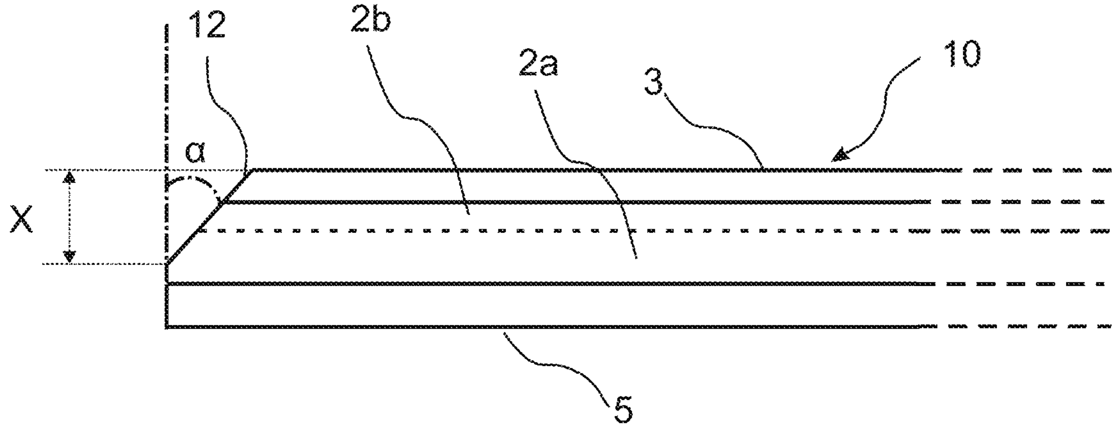
Figure 4B:
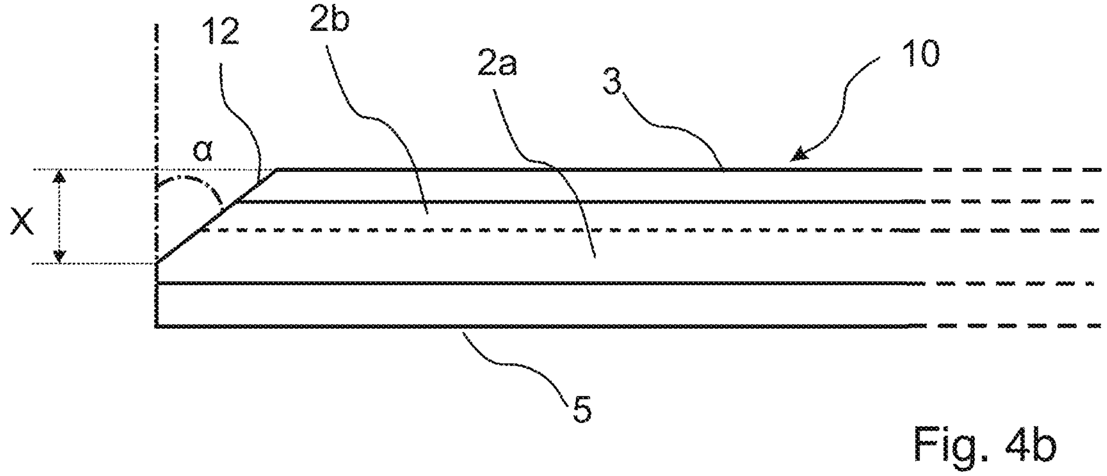
Figure 4C:
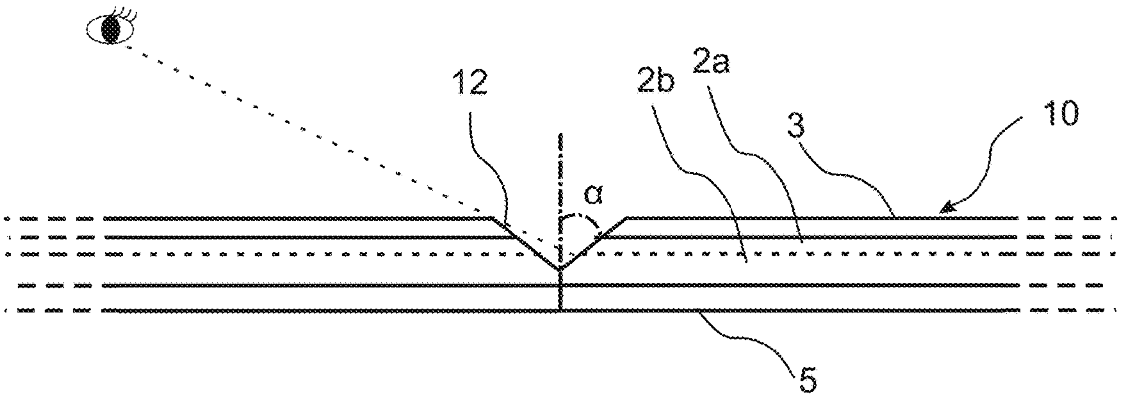
Figure 4D:
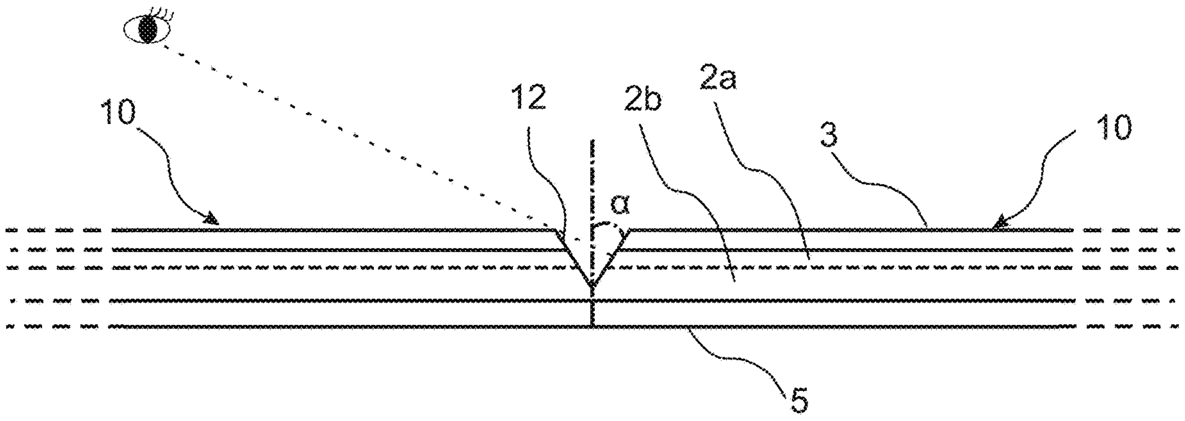

Angle:

FIGS. 4*a* and 4*b* illustrate two possible ways where the angle $\alpha$ of the bevel differs, which is another way of controlling the appearance of the bevel. The angle is measured between the vertical plane and the surface of the bevel, as illustrated in the figures. FIGS. 4*c* and 4*d* illustrate two veneered elements arranged next to each other with their bevels facing each other, which is an illustrative way of describing the effect of different bevel angles are having on a user walking on the floor. For example, if a user looks at the area where the two veneered elements meet and not straight from above, one of the bevels will cast a shadow on the other bevel. A bevel with a flatter angle, see FIG. 4*c*, will not affect the opposite bevel with its shadow as much as a bevel with a steeper angle, see FIG. 4*d*. This may result in that the appearance of the second layer is amplified. Thus, the design of the flooring perceived by a user walking over the floor will be affected by the angle $\alpha$ of the bevel.

A preferred angle $\alpha$ of a bevel is between 15° and 75°, more preferably the angle $\alpha$ is between 20° and 50°, and even more preferably between 30° and 45°.

Shape:

Yet a further possible way of adjusting the appearance of the bevel is to change the shape of it. The shape of the bevel may either be straight, concave or convex. A straight bevel will have an effect where all layers complement each other whereas a concave shape will highlight the first layer and the veneer layer, and the convex shape will highlight the second layer. Thus, all three possible shapes will affect the design of the bevel.

Layer Properties—Thickness, Coloring, Opacity

Thickness:

Further possible ways include adjusting the layer properties such as the thickness of the first layer and the second layer. It is preferred to apply at least a total powder amount of 300 $g/m^2$ to achieve the desirable adhesion, divided between the first and the second powder. More preferably, the total powder amount is at least 350 $g/m^2$.

Test 1:

The first powder was scattered onto a core, a HDF board, forming the first layer. The second powder was scattered onto the first layer, forming the second layer. The amount of the second powder was varied in order to create thinner or thicker second layer. The powder amounts are presented in Table 1. The powder recipes are presented in Table 2.

TABLE 1

| Powder amounts used in experiments | | |
|---|---|---|
| Experiment no. | Amount of the first powder (g/m$^2$) | Amount of the second powder (g/m$^2$) |
| 1 | 430 | 50 |
| 2 | 430 | 80 |
| 3 | 430 | 100 |
| 4 | 430 | 120 |
| 5 | 430 | 150 |
| 6 | 430 | 200 |
| 7 | 430 | 275 |

TABLE 2

| Powder recipes | | |
|---|---|---|
| Ingredients | First powder (wt. %) | Second powder (wt. %) |
| Wood powder | 48 | 43 |
| Melamine formaldehyde | 47.5 | 45 |
| Dark wood powder | — | 7.5 |
| Ceramic filler | 4.5 | 4.5 |

After the second layer has been formed a 0.6 mm thick, on average, wood veneer layer was applied on top of the second layer. The wood veneer layer included open features such as pores, holes, cracks and/or knots. Heating and pressure were applied to the wood veneer layer curing the powder layers and compressing the wood veneer.

The specimens were then profiled with a 30° bevel with a 0.3 depth. The veneered element was fitted together with several other veneered element in order to visually inspect the design of the finished veneered element. If the bevel was perceived as too dark, it was a clear indication that the second powder had influenced the colour, not only on the surface, e.g., in the open features, but also in the bevel. The rating system is explained in Table 3.

TABLE 3

| explanation of the rating system | |
|---|---|
| Rating | Explanation |
| A | Optimum visual properties. The top layer is not visually apparent in the bevel, but visually dominant in the open features of the veneer layer |
| B | OK result. The top layer is partly visual in the bevel, but the first layer is dominant, and/or the first layer is visually influencing but not dominant in the open features of the veneer layer |
| C | Failed result. The second layer is visually too dominant in the bevel, and/or the first layer is visually too dominant in the open features of the veneer layer |

The results of the experiments are summarized in Table 4. As can be seen, using the settings in this test, the optimum amount of the second powder is between 50 g/m$^2$ and 200 g/m$^2$.

TABLE 4

| Ratings of the different experiments | | |
|---|---|---|
| Experiment no. | Rating | Deviation from optimum |
| 1 | B | The first layer is influencing but not dominant in the open features of the veneer layer |
| 2 | A | Optimal visual properties. The top layer is not visually apparent in the bevel, but visually dominant in the open features of the veneer layer |
| 3 | A | Optimal visual properties. The top layer is not visually apparent in the bevel, but visually dominant in the open features of the veneer layer |
| 4 | A | Optimal visual properties. The top layer is not visually apparent in the bevel, but visually dominant in the open features of the veneer layer |
| 5 | B | The second layer is partly visual in the bevel but the first layer is dominant |
| 6 | B | The second layer is partly visual in the bevel but the first layer is dominant |
| 7 | C | The second layer is visually too dominant in the bevel |

Colouring:

Further, the colouring of the first and second powder may be adjusted. The colour of the powders may be achieved by fibres, pigments and/or dye. As described above regarding FIG. 6, the effect of the colouring of the first and second powder is obvious if the veneer layer has open features through which at least the second layer is visible. It can further be desirable to create a bevel with a different colour while still keeping the visual appearance in the open features of the veneer layer constant. For example, the bevel could be blue or red or non-colored while having the edge of the open features of the veneer layer dark brown or black. Any two colours could be combined in the above described way.

A transparent second layer could be used with an additional functionality, such as UV-stability, protecting the first layer from aging. The first layer colour would then appear in both bevel and veneer defects through the second layer in order to not expose the core/substrate colour.

Opacity:

Yet further, the opacity of the first and second powder may be another way of controlling the appearance of the first and second layer in the veneered element and Test 2 illustrates that. tex påverka opacity dark wood fibres, pigment Test 2:

The first powder was scattered onto a core, a HDF board, forming the first layer. The test includes two alternative second powders, A and B, which were scattered onto the first layer, forming the second layer. The difference between the second powder A and the second powder B was that the second powder B had a lower opacity than second powder A. The amount of the second powders were varied in the test.

After the second layer has been formed an averagely 0.6 mm thick wood veneer layer was applied on top of the second layer. The wood veneer layer included open features such as pores, holes, cracks and/or knots. Heating and pressure were applied to the wood veneer layer curing the powder layers and compressing the wood veneer. Table 5 discloses the powder amounts used in the experiments and Table 6 discloses the different powder recipes.

TABLE 5

| Powder amounts used in experiments | | | |
|---|---|---|---|
| Experiment. no | Amount of first powder (g/m$^2$) | Amount of second powder A (g/m$^2$) | Amount of second powder B (g/m$^2$) |
| 1a | 430 | 50 | — |
| 1b | 430 | — | 50 |
| 2a | 430 | 80 | — |
| 2b | 430 | — | 80 |
| 3a | 430 | 100 | — |
| 3b | 430 | — | 100 |
| 4a | 430 | 120 | — |
| 4b | 430 | — | 120 |
| 5a | 430 | 150 | — |
| 5b | 430 | — | 150 |
| 6a | 430 | 200 | — |
| 6b | 430 | — | 200 |

TABLE 6

| Powder recipes | | | |
|---|---|---|---|
| Ingredients | First powder (wt. %) | Second powder A (wt. %) | Second powder B (wt. %) |
| Wood powder | 48 | 43 | 43 |
| Melamine formaldehyde | 47.5 | 45 | 45 |
| Dark wood powder | — | 7.5 | — |
| Ceramic filler | 4.5 | 4.5 | 4.5 |
| Pigment | — | — | 7.5 |

The second powder A has a higher opacity than second powder B, due to the added dark wood powder in second powder A, thus the same coverage can be achieved with a lower powder amount with second powder A compared to second powder B.

The specimen of the veneer element was then profiled with a 60° bevel with a 0.5 mm depth. The result, after visual inspection, was that due to the lower powder amount of second powder B (because of the lower opacity) it becomes less visual in the bevel. At the same time, a lower amount of second powder B did not affect the appearance of the second layer in the open features of the veneer layer. Conclusion, if it is desirable to have a second layer less visual in the bevel without affecting the appearance in the open features a second powder with lower opacity is preferred.

Veneer Properties—Thickness, Types

Figure 5A:
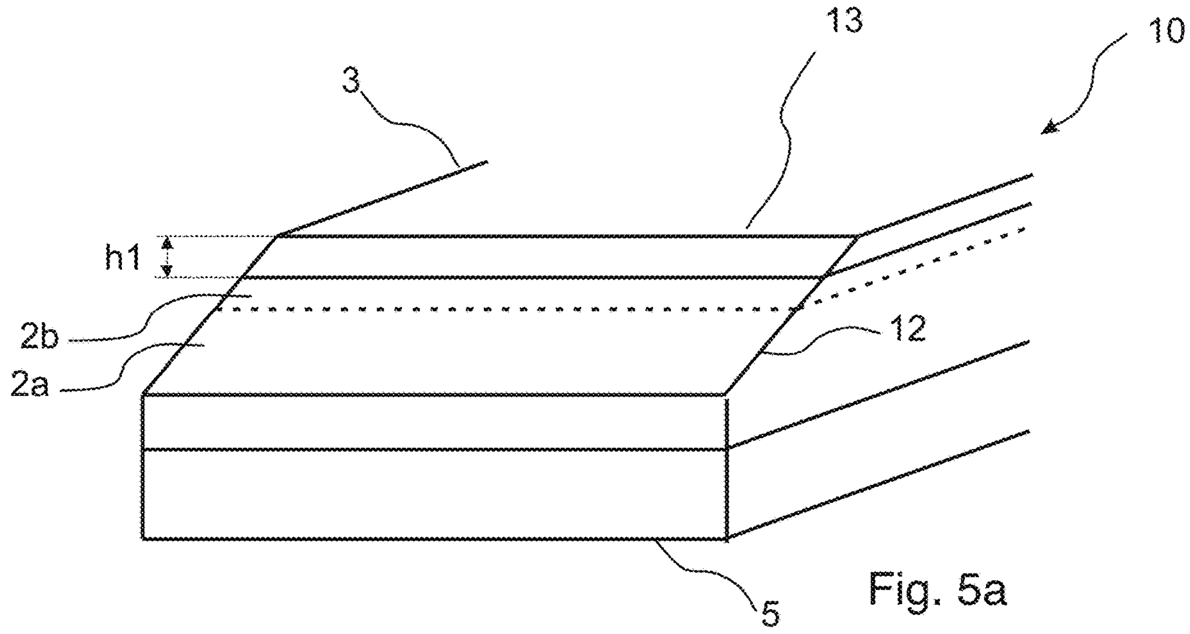
Figure 5B:
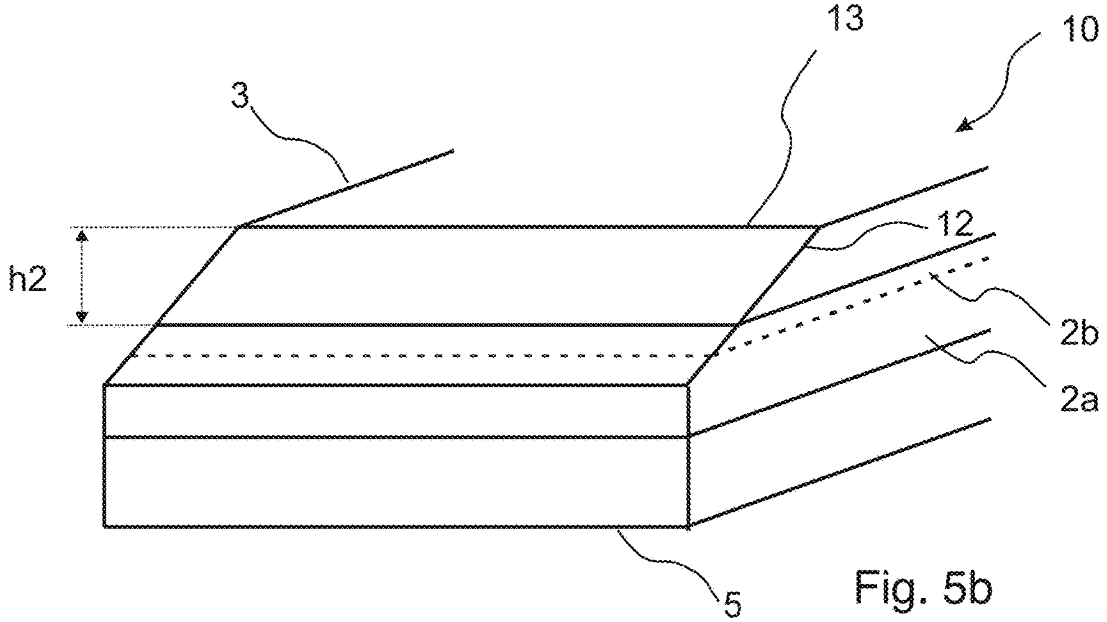

Thickness:

It is also possible to change, e.g., the thickness of the veneer layer to affect the design of the veneered element, as illustrated in FIGS. 5*a* and 5*b*. A thicker veneer layer will be more exposed in the bevel of the veneered element and a thinner veneer layer will result in a bevel exposing more of the first and second layer, given that the properties of the bevel are the same. Thus, the coloring of the veneer layer has a greater or lesser impact on the appearance of the bevel. Further which is clearly illustrated in FIGS. 5*a* and 5*b*, having a thinner veneer layer 3 would result in exposing at least one of the first and second layer 2*a*, 2*b* more compared to having a thicker layer. In the figures the first layer 2*a* will have more influence on the appearance of the bevel 12 as it is exposed more in the bevel 12.

Type:

The design of the veneered element is also dependent on the type of veneer layer, for example which type of wood is used. Ash, birch, oak and walnut have all different characteristics and features. This of course also affects the appearance of the open features in the veneer layer and the bevel. In Test 3, below, ash and walnut are compared.

Test 3:

The first powder was scattered onto a core, a HDF board, forming the first layer. The second powder was scattered onto the first layer, forming the second layer. The amount of the first powder and the amount of the second powder were varied in order to create thinner or thicker of respective layers. The powder amounts are presented in Table 7. The powder recipes are presented in Table 8. On top of the second layer a wood veneer layer was applied, where the wood veneer layer was of either ash or walnut. The wood veneer layer included open features such as pores, holes, cracks and/or knots. Heating and pressure were applied to the wood veneer layer curing the powder layers and compressing the wood veneer.

TABLE 7

| Powder amounts and veneer type used in different experiments | | | |
|---|---|---|---|
| Experiment no. | Amount of first powder (g/m$^2$) | Amount of second powder (g/m$^2$) | Wood veneer type |
| 1a | 430 | 50 | Ash |
| 1b | 50 | 430 | Ash |
| 2a | 430 | 50 | Walnut |
| 2b | 50 | 430 | Walnut |

TABLE 8

| Powder recipes | | |
|---|---|---|
| Ingredients | First powder (wt. %) | Second powder (wt. %) |
| Wood powder | 48 | 43 |
| Melamine formaldehyde | 47.5 | 45 |
| Dark wood powder | — | 7.5 |
| Ceramic filler | 4.5 | 4.5 |

The specimen of the veneer element was then profiled with a 60° bevel with a 0.5 mm depth. The result, after visual inspection, was that the layer with the highest amount of powder decided the properties of the bevel, and in the above test the colour of the bevel. It was seen that a bright ash veneer layer in combination with a dominant first powder (brighter bevel), see experiment no. 1a, the colour contrast was reduced in comparison to the bright ash veneer layer in combination with a dominant second powder (darker bevel), see experiment no. 1b. The same but opposite applied to the dark walnut veneer layer which in combination with a dominant second powder (dark bevel), see experiment no. 2b, reduces colour contrast in comparison to the dark walnut veneer layer in combination with a dominant first powder (brighter bevel), see experiment no. 2a.

Finally, although the inventive concept has been described above with reference to specific embodiments, it is not intended to be limited to the specific form set forth herein. Rather, the invention is limited only by the accompanying claims. Other embodiments than the specific above are equally possible within the scope of the appended claims.

The invention claimed is:

1. A veneer element, comprising:

a first layer, a second layer above the first layer, a veneer layer above the second layer, and a bevel arranged at least partly along at least one side portion of said veneer element, wherein the first layer, the second layer and the veneer layer are at least partly exposed in the bevel, and wherein the first layer is different from the second layer, wherein the second layer is thicker than the first layer, wherein the second layer is darker than the first layer, wherein the second layer is visible through at least a portion of an open feature of the veneer layer.

2. The veneer element according to claim 1, wherein the bevel has a depth of between 0.1 and 0.7 mm.

3. The veneer element according to claim 1, wherein the bevel has an angle α in the range of about 15 to about 75 degrees.

4. The veneer element according to claim 1, wherein the first layer comprises a first powder that has been heated and pressed together and the second layer comprises a second powder that has been heated and pressed together.

5. The veneer element according to claim 1, wherein the open feature of the veneer layer is at least partly filled with material originated from at least the second layer.

6. The veneer element according to claim 5, wherein the open feature of the veneer layer is a crack, cavity, hole and/or knot.

7. The veneer element according to claim 1, further comprising a substrate on which the first layer is arranged, wherein the substrate comprises one or more of: wood-based board, a particleboard, a thermoplastic board, a plywood, a lamella core, a veneer layer, a sheet and/or a non-woven.

8. The veneer element according to claim 1, wherein the bevel has a depth of between 0.2 and 0.5 mm.

9. The veneer element according to claim 1, wherein the bevel has an angle α in the range of about 20 to about 50 degrees.

10. The veneer element according to claim 1, wherein the bevel has an angle α in the range of about 30 to 45 degrees.

11. The veneer element according to claim 1, wherein the open feature of the veneer layer is a crack, cavity, hole and/or knot.

12. The veneer element according to claim 1, wherein the first layer comprises colouring.

13. The veneer element according to claim 1, wherein the second layer comprises colouring.

14. The veneer element according to claim 1, wherein the second layer comprises dark wood fibres.

15. The veneer element according to claim 1, wherein the veneer element is produced by:

providing a first powder layer, applying a second powder layer above the first powder layer, applying a veneer layer above the second powder layer, heating and pressing the first powder layer, the second powder layer and the veneer layer together to form the veneer element, forming the bevel at least partly along at least one side portion of the veneer element.

16. The veneer element according to claim 15, wherein the second powder layer is applied in an amount of 50-150 $g/m^2$.

17. The veneer element according to claim 15, wherein the second powder layer is applied in an amount of 80-120 $g/m^2$.

* * * * *